June 21, 1966   D. V. ANDERSON ETAL   3,256,556
DEVICE FOR REMOVING THE MEAT FROM KING CRAB LEGS
Original Filed March 20, 1961   6 Sheets-Sheet 3
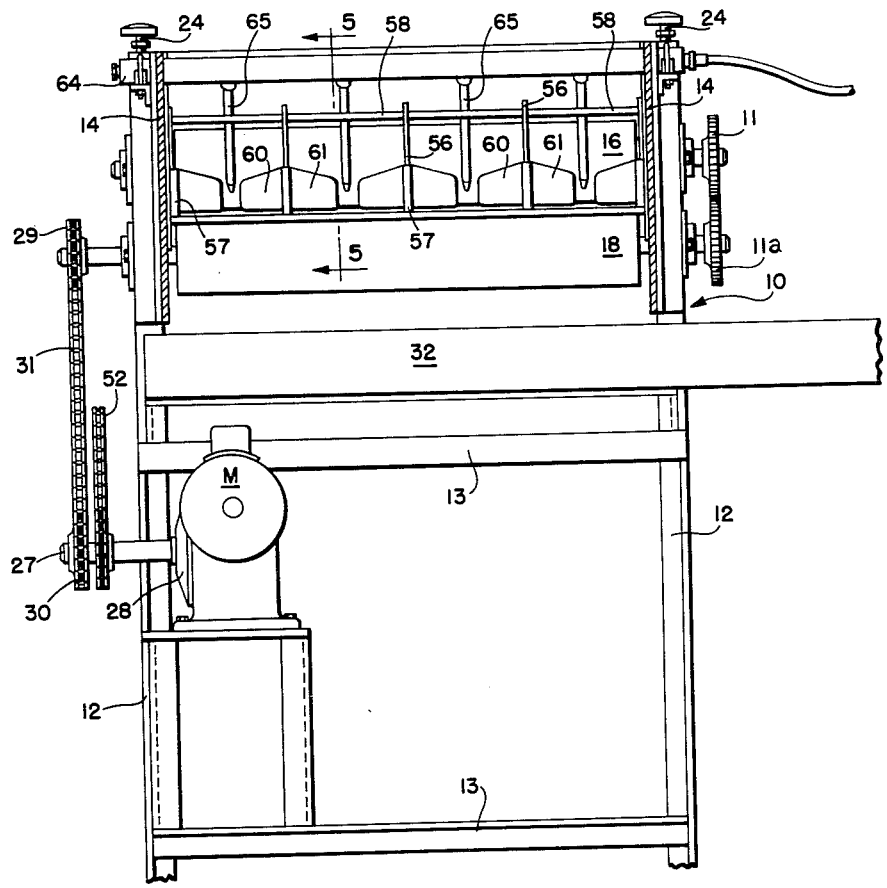
FIG___3
DONALD V. ANDERSON
JAMES G. GILLMAN
  INVENTORS
BY Robert W. Beach
  ATTORNEY

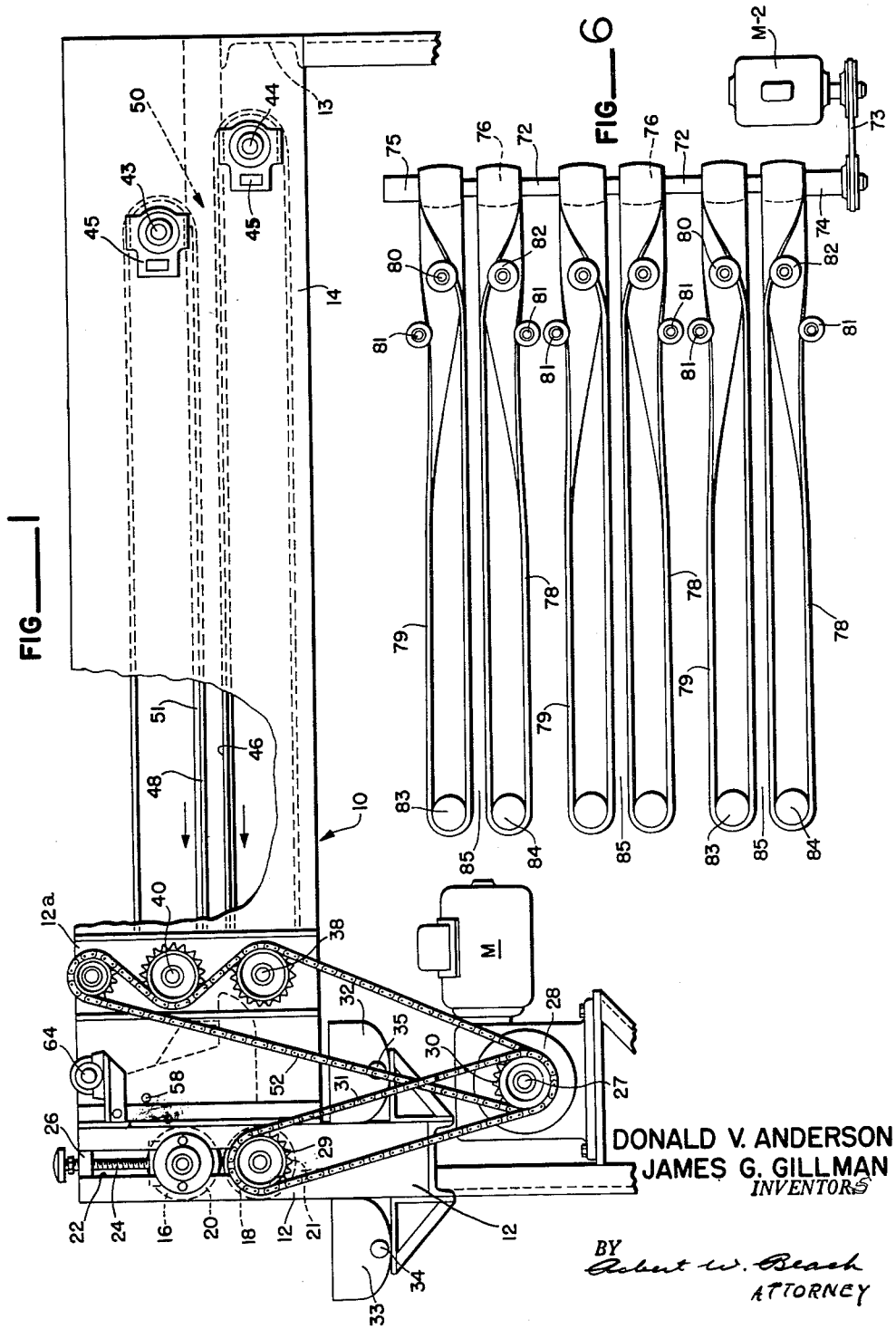

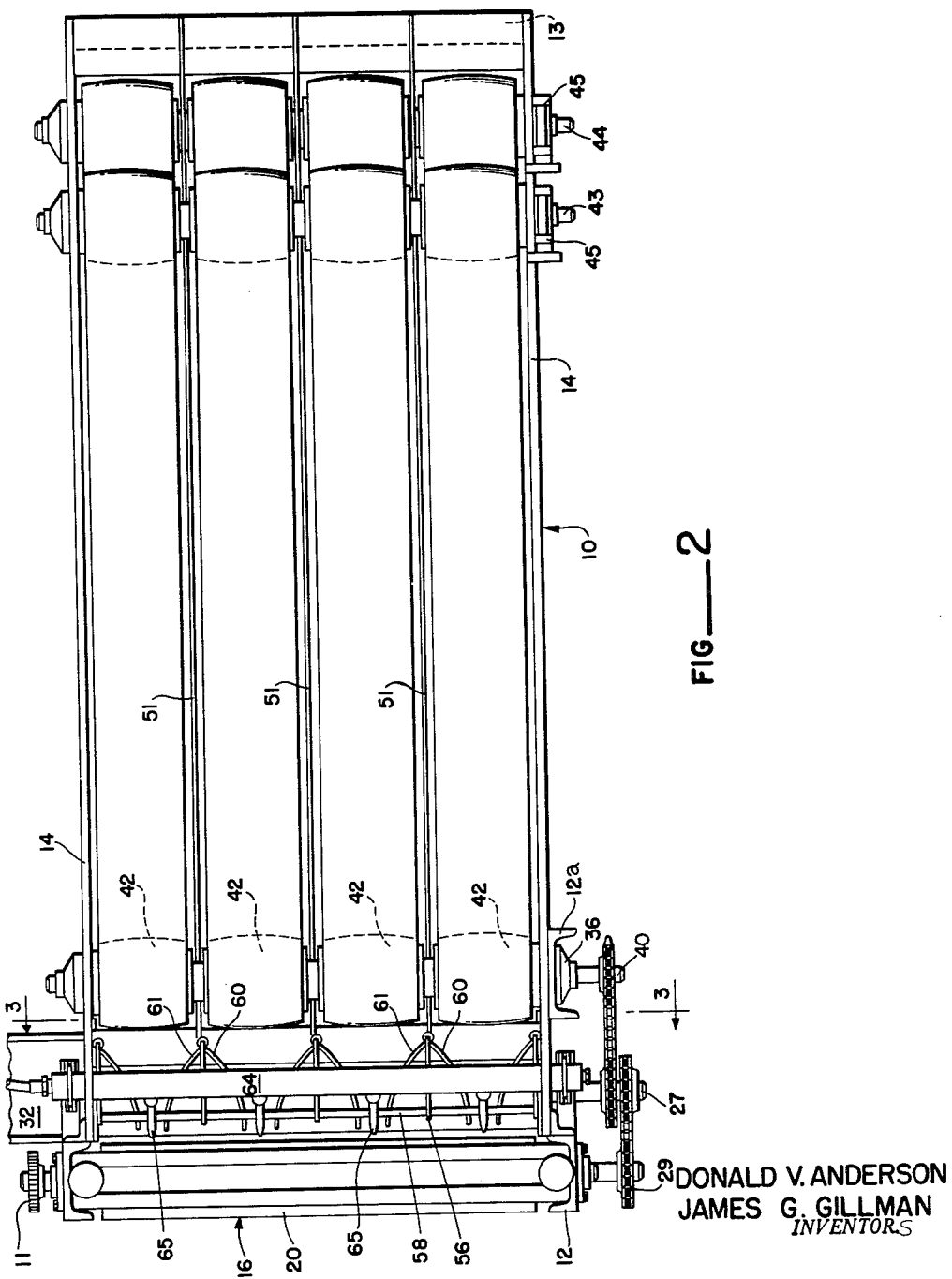

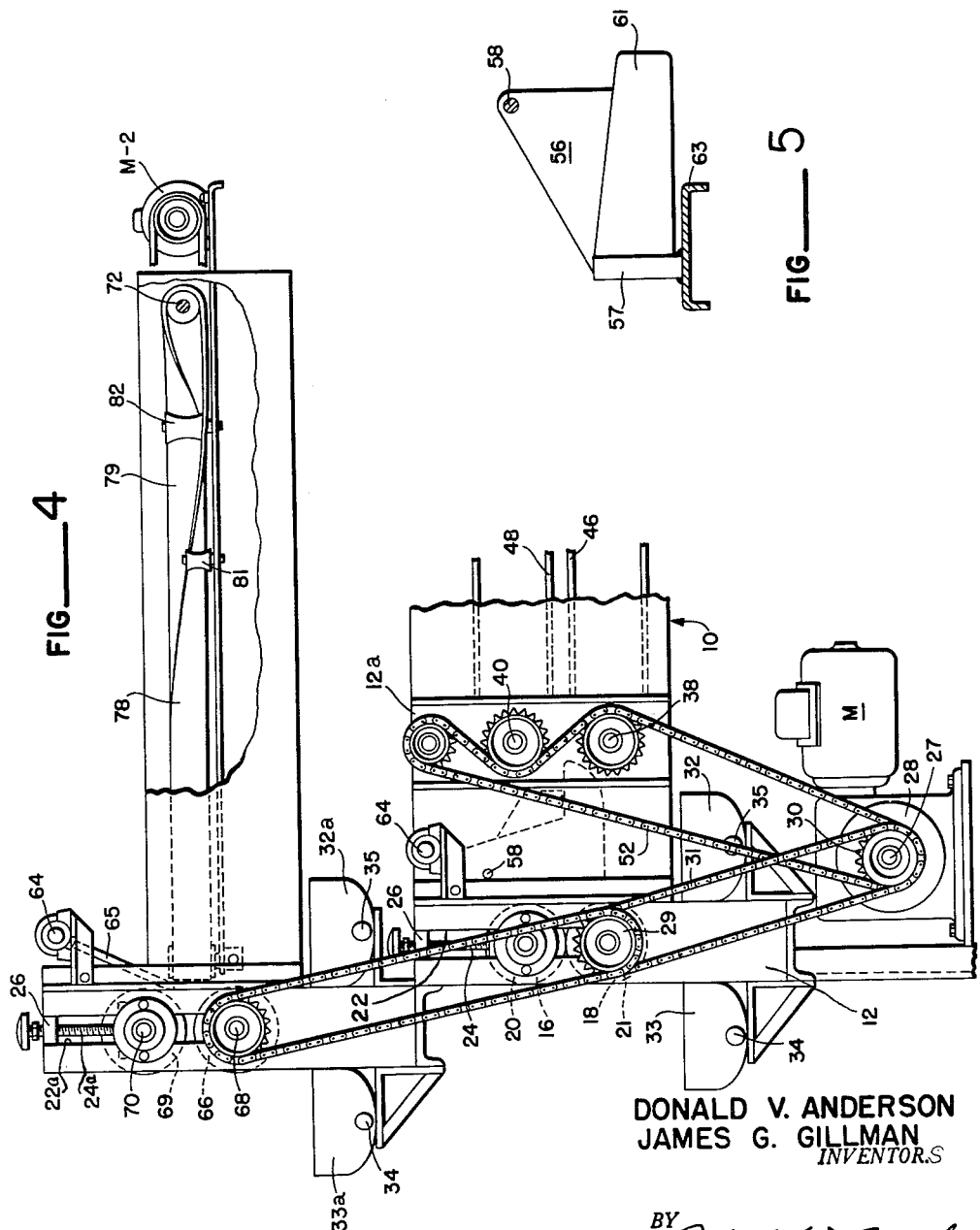

June 21, 1966    D. V. ANDERSON ET AL    3,256,556
DEVICE FOR REMOVING THE MEAT FROM KING CRAB LEGS
Original Filed March 20, 1961    6 Sheets-Sheet 5
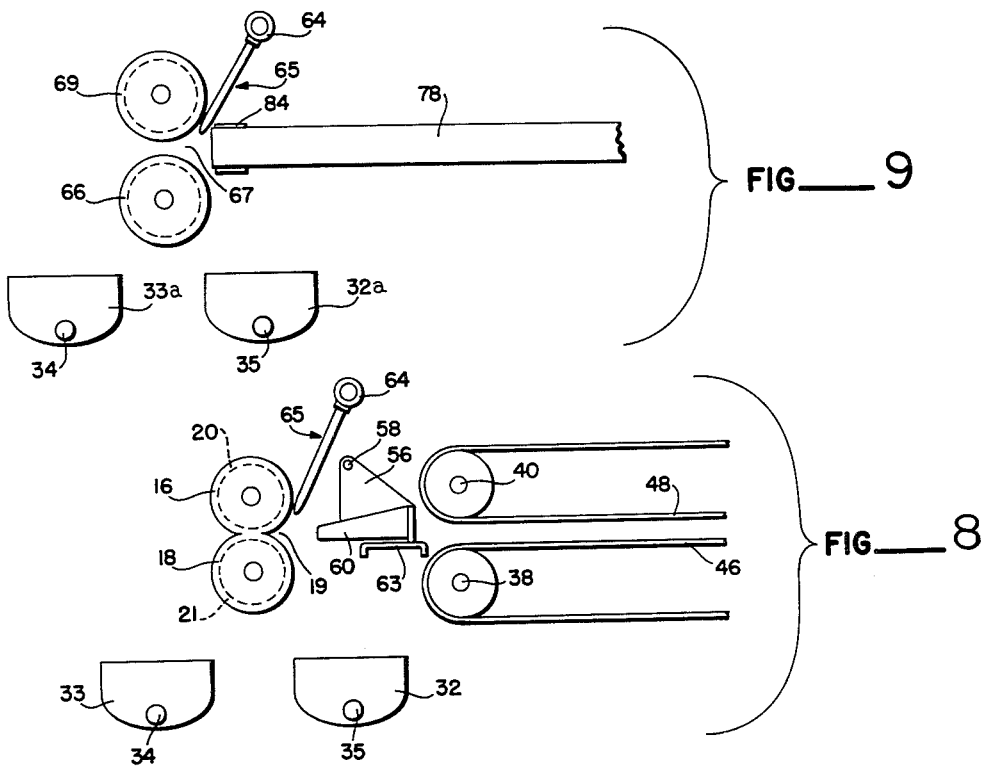
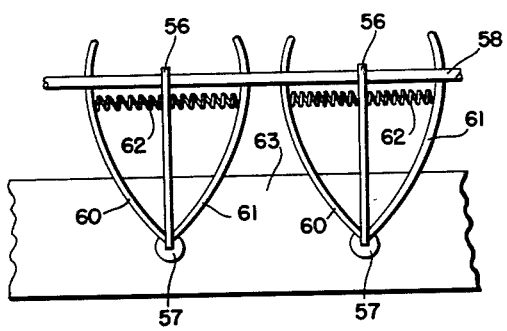
DONALD V. ANDERSON
JAMES G. GILLMAN
*INVENTORS*
BY
Robert W. Beach
ATTORNEY

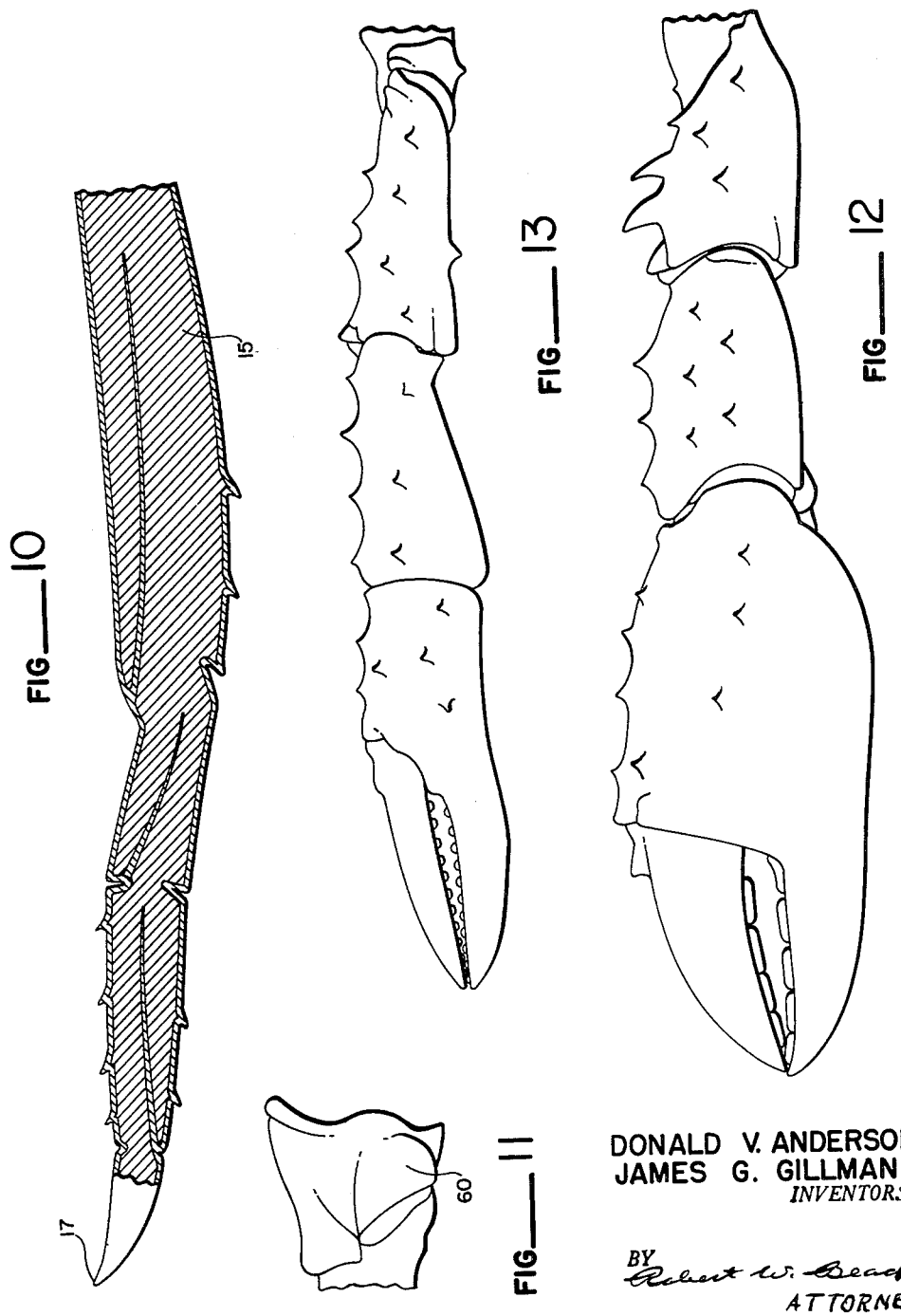

United States Patent Office 3,256,556
Patented June 21, 1966

3,256,556
DEVICE FOR REMOVING THE MEAT FROM KING CRAB LEGS
Donald Victor Anderson, Depoe Bay, Oreg., and James George Gillman, Kirkland, Wash., assignors of thirty percent to Wayne Luders and ten percent to Paul D. Jackson
Continuation of application Ser. No. 97,090, Mar. 20, 1961. This application Dec. 18, 1963, Ser. No. 331,452
9 Claims. (Cl. 17—2)

This application is a continuation of our application Serial No. 97,090, filed March 20, 1961, now abandoned.

This present device consists of a meat extracting machine for removing the edible meat from the legs and claws of king crab, which range from 12 to 18 inches in length and up to two inches in diameter in parts.

In the past the edible meat has been removed from king crab legs by hand operation, which is very wasteful of the crab meat. The hand operation is normally aided only by supplying some means for introducing a jet of air, or preferably of water, at the small end of a leg severed from the crab body to blow the meat out of the legs. Applying pressure to the end of a column of meat which might be from twelve to eighteen inches long caused a compacting of the meat and added to the difficulty of forcing it out of the long tubular shell. A further complication resulted from the presence of long tough tendons extending lengthwise through the legs, which tie the muscles to the leg joints so that the joints can be manipulated. These tendons taper, the large end being secured to the shell of the leg and the free end being bonded to the muscles and extending toward the large end of the crab leg. As a result of the difficulties involved in the removal of the meat from king crab legs the average person could remove only about sixty pounds of meat per hour, and a very experienced person, working under the most ideal conditions, could only remove as much as one hundred pounds an hour.

The necessity for so much manual labor in the removal of king crab leg and claw meat added materially not only to the cost of processing the meat but also to the price paid by the ultimate consumer. The meat of king crab legs and claws is of good size and is an excellent food but the difficulty and expense of processing it has in the past greatly curtailed its comercial sale. Use of the present device results in an appreciable reduction in the cost of extracting such meat.

The principal object of this present invention, therefore, is to provide means for mechanically applying resilient pressure to the small end of a king crab leg by coacting rollers so that the meat will be squeezed out of the full length of the leg shell normally in a single connected piece.

A further object is to provide means for the pressure expulsion of the edible meat from a king crab leg by which the pressure is applied first to a portion of the leg adjacent to the large end of each of the various tendons and moved progressively toward the small end of the tendons in the progressive expulsion of the meat from the shell so that the meat is stripped off the tendons as the meat is pushed out of the shell, thus making it possible to remove all of the meat from a single leg as one connected piece.

Another object is to provide resiliently faced pressure rollers mounted with their axes in fixed parallel relationship which operate to squeeze the meat out of the shell of a king crab leg or claw.

It is also an object to provide belt feeding means for feeding king crab legs, knuckles and claws into the pressure rollers, thus making it a safe operation. Also, the small end of the crab leg will be oriented to the pressure rollers is a manner to insure most satisfactory removal of the meat. The feeding means can be of sufficient extent so that several persons can be feeding the machine at the same time, thus operating it to its full capacity.

A further object of this invention is to provide preferably two pairs of coacting rollers which are spaced apart sufficiently so that two separate feeding means may be provided, one for each set of rollers, yet such sets of rollers being disposed close enough together so that a person can selectively place a portion of a crab leg on the feeding means to one set of rollers or a large leg or claw on the feeding means to the other set of rollers.

This machine comprises one or more sets of resiliently faced rollers which are used in coacting pairs to squeeze the meat out of the long legs of king crabs. The axes on which the rollers revolve are fixed with respect to each other. The machine preferably combines two coacting pair of rollers; the rollers of one pair are in contact throughout their lengths to accept the long section of the leg and the rollers of the other pair are spaced apart sufficiently to accept under pressure the large knuckle portion at the large end of the leg and claws. In both cases the rollers are larger in diameter than the legs of the crab. Means are combined with these pairs of rollers for the accurate and remote feeding of the crab parts into the nip between the coacting rollers of a pair and means are further provided for the proper orientation of the legs just before they are presented to the rollers.

FIGURE 1 is a side elevation of our crab leg meat extracting machine with the frame partially broken away to expose the belt conveying arrangement, the form shown in this figure being designed to operate on only the legs of the crab after the knuckles have been removed.

FIGURE 2 is a top plan of the device shown in FIGURE 1 with certain parts removed for clarity in showing the belt arrangements.

FIGURE 3 is a transverse, vertical section taken along the line 3—3 of FIGURE 2.

FIGURE 4 is a side elevation of a complete machine with equipment for feeding the crab legs being broken away, the portion of the machine particularly adaptable for squeezing the meat from the leg knuckles and the claws being located above the position for processing the smaller portions of the crab leg.

FIGURE 5 is a cross-sectional view taken along the line 5—5 of FIGURE 3 on an enlarged scale.

FIGURE 6 is a diagrammatic view illustrating the conveying belts and the drive and guiding means therefor used to feed the knuckles and claws to the rollers.

FIGURE 7 is an enlarged top plan of the resilient guide means, five units of which are employed.

FIGURE 8 is a diagrammatic elevation showing the relationship between the rollers, the leg conveying belts, the meat and shell receiving troughs and the water jets for removing the meat from king crab legs.

FIGURE 9 is a diagrammatic elevation showing the relationship between the belts, the rollers, the water jets and the meat and shell receiving troughs used for the knuckles and claws of king crabs.

FIGURE 10 is a longitudinal section through the major portion of the length of a king crab leg including the tip, showing the heavy tendons attaching the muscle to the joints of the crab leg.

FIGURE 11 is an elevation of the knuckle portion at the root of the crab leg broken from the remainder of the leg for separate cleaning.

FIGURE 12 is an elevation of the right claw of the king crab, and FIGURE 13 is an elevation of the left claw which habitually is smaller than the right claw.

A metal fabricated frame 10 shown in FIGURES 1 and 3 includes a plurality of vertical members 12, transverse members 13 and longitudinal members 14. The transverse members serve as mounting means for much of the equipment, including the motor M. The form of machine illustrated in FIGURE 1 is utilized for squeezing the meat out of the long king crab legs 15 in FIGURE 10. These legs are usually 18 to 20 inches in over-all length. FIGURE 4 shows, superimposed over the crab leg cleaning portion of the machine, means for squeezing the meat out of the knuckles forming the root ends of the legs and constituting the joints where they are secured to the crab body. These knuckles are often an inch and a half or more in diameter, whereas the average diameter of the remainder of the crab leg varies from about one half inch at the small end next to the tip to an inch at the large end where the knuckle is broken off. The claws of the crab are relatively short but quite thick.

Experience has shown that it is preferable not to use the same machine for removing the meat from both the major portions of the crab legs and from the leg knuckles and claws. The crab legs are normally complete when given to the workmen and, as a first step, the knuckles are broken off the legs. It is most economical of both time and effort if the legs can be conveniently fed to one machine and the knuckles and claws fed to another machine within easy reach of the workmen. It is for this reason that FIGURE 4 shows a combination of the two machines for processing separately the different portions of the entire crab legs and the claws.

The crab leg portion of the machine is best illustrated in FIGURES 1, 2 and 3. Rotative in bearings secured to the vertical frame members 12 are two rubber-faced rollers 16 and 18. The peripheries of these rollers are normally in reasonably firm contact to provide a nip 19 shown in FIGURE 8 on the infeed side of such rollers. Into such nip can be moved the very tip 17 of a crab leg claw toward which the long crab leg tapers, as shown in FIGURE 10. The larger the diameter of such rollers 16 and 18, the smaller will be the angle included between the surfaces of such rollers which engage the crab leg tip. Such engagement must be sufficiently good to grip the tip of the leg and draw it between the rollers for crushing the shell of the crab leg. The pressure of the rollers must also have the effect on the meat column within the leg of wedging it toward the larger end of the leg as the leg moves tip first between the rollers. By this action the meat is expressed from the leg shell instead of passing between the rollers. Rollers having an outside diameter of at least four inches are satisfactory for this purpose.

Rubber roller facing assists greatly in enabling the rollers to grip the tip of the crab leg effectively so that at least one of such rollers must have such a resilient facing. It is, of course, well known that various synthetics or plastics may be used to provide a suitable resilient rubber-like roller covering. The facing material may, for example, have the general properties of Number 20 temper of neoprene synthetic rubber. It is essential that the material be relatively dense so that there are no voids in which small particles of crab meat or dirt would tend to lodge.

To provide a satisfactory grip on the tip of the crab leg the resilient roller facing must be capable of yielding resiliently to a sufficient degree so as to embrace to a substantial extent the tip of a crab leg to effect its passage between the rollers. The resilient facing on the metal core of a roller should therefore be in excess of ½ inch in thickness and preferably the combined thicknesses of the facings on the two rollers 16 and 18 would be equal to at least one inch. The thicknesses of the facings 20 and 21 on rollers 16 and 18 in FIGURE 8 of the drawings are indicated as being equal.

The rollers 16 and 18 are rotatively supported in end bearings slidable in a slot 22 in the upright frame member 12, as shown in FIGURE 4. The bearings for the lower roller 18 may be supported in the lower end of slot 22, and the bearings for roller 16 may be slid down such slot until the roller peripheries are in engagement.

A follower thrust screw 24 engageable with the bearings of the upper roller 16 may be tightened sufficiently to prevent the upper roller from being raised appreciably even by the pressure produced by several large crab legs being passed between the rollers simultaneously. Such screw is threaded through the fixed thrust block 26. It is not desirable to provide resilient means pressing the rollers 16 and 18 toward each other, which would permit such rollers to separate appreciably. Instead, reliance is placed upon the resiliency of the roller facing to provide adequate engagement with the crab leg. Holding the rollers in close proximity as the crab leg passes between them will effect complete expulsion of the meat from the crab leg shell.

As shown in FIGURES 1, 3 and 4, the lower roller 18 can be driven by an electric motor M coupled to the speed reducer 28. A sprocket 29 fixed on the shaft of roller 18 and sprocket 30 on the speed reducer shaft 27 are connected by chain 31. If the peripheries of the rollers 16 and 18 are not pressed tightly into engagement so that the roller 16 will be driven frictionally by the roller 18, the two roller shafts can be connected for positive rotation in opposite directions by gears 11 and 11a shown in FIGURE 3.

The meat collecting trough 32 and the shell collecting trough 33 are mounted on brackets attached to opposite sides of the vertical frame 12, as shown in FIGURES 1 and 4. As a crab leg passes into the nip 19 of the rollers 16 and 18 at their feed side the meat of the crab leg is squeezed away from the leg tip, which shears the meat from the inner side of the shell and strips it from the tendons, so that the meat emerges progressively from the large end of the meat shell at the feed side of the rollers and falls into the meat collecting trough 32. The empty shell, flattened by its passags between the rollers 16 and 18, is discharged at the side of the rollers opposite the nip 19 and drops into the shell collecting trough 33. Troughs 32 and 33 preferably slope slightly lengthwise. Water supplied to the troughs by the pipes 34 and 35 at their high ends will flush all the meat and the shells out of the troughs. Sluicing the meat from the machine in this manner handles it gently so that the large pieces, in most cases the entire column of meat expressed from a single leg, will not be broken up.

A water supply pipe 64 extends across the machine above and parallel to the rollers 16 and 18, as shown in FIGURES 1, 4, 8 and 9. From this pipe a plurality of short pipes 65, preferably of flexible tubing, project downward. These short pipes can be adjusted to direct water jets into the nip 19 in FIGURE 8 and 67 in FIGURE 9 at the feed side of the rollers. The force of such jets will be sufficient to wash any meat from the surface of the rollers into the meat collecting trough 32. Also such jets assist in washing particles of meat and fragments of shell from the roller surfaces to cleanse them.

In order to bring the crab legs to the pressure rollers, from a point away from the machine, longitudinal members 14 are provided which in turn are normally secured to both the vertical and transverse frame members 12 and 13 as by welding thereto. Journaled in bearings 36, which are secured to secondary vertical frame member 12a, is a lower pulley shaft 38 and an upper pulley shaft 40. These shafts, in the form of our machine illustrated, each have mounted thereon four belt pulleys 42. At the opposite end of the machine there are again two separate pulley shafts as 43 and 44. Theses hafts are provided at each side with adjustable take-up devices 45 so that the belts which are operatively supported by the shafts 38 and 44 and 40 and 43, respectively, can be adjusted for proper tension.

Referring particularly to FIGURE 1, it will be noted that the upper run of platform belts 46 and the lower run of positioning belts 48 both run at the same speed and in the same direction, which is toward the meat-removing pressure rollers 16 and 18. It has been found desirable to have the legs introduced at a point substantially at 50 between the two belts, and, with the shafts 43 and 44 offset as indicated in FIGURE 1, it is relatively easy to do this. The legs are moved forwardly by the belts at considerable speed.

It is very desirable that the legs be straightened out and presented to the meat extracting rollers with the pointed end or tip foremost, but more particularly it is desired that the different joints of the leg be substantially axially aligned so that there will be no points of resistance at the joints of the legs, which can easily occur if the successive joints are not aligned. As the legs are moved toward the rollers by the belts their joints are thus straightened out by the pressure of the coacting faces of the belts and the side division members 51, which separate each of the groups of belts and side frame members 14. Belts 46 and 48 are driven in their proper direction by the chain 52 which is driven by a separate sprocket on the reduction gear output shaft 27.

Completing the guiding means are resilient guide members, illustrated in FIGURES 1, 5 and 8 in side elevation, in FIGURE 3 in end elevation and in FIGURES 2 and 7 in top plan view, FIGURE 7 showing the parts on an enlarged scale. Here it will be noted that each unit has a fixed member 56 which is secured to a pillar 57 at one end and to a transverse rod 58 at the other end. The resilient guide members, as 60 and 61, are secured only to pillar 57 and are additionally spring biased by springs 62 to provide a discharge opening for the crab legs to pass through just prior to entering the pressure rollers. This opening is just wide enough to engage the smaller end of the crab leg and the guide members are thereafter spread as the leg portions of greater size pass through the device. These guide members are very desirable for the workability of this equipment.

In the upper portion of FIGURE 4 and in FIGURE 6 the belt feeding means for the large diameter crab leg knuckles and pincer legs or claws is illustrated. The rollers themselves, inasmuch as they are handling large pieces of crab legs and the like, are preferably of a larger diameter, and experience to date indicates that five inch diameter rollers 66 and 69 will handle the claws and knuckle portions of the legs. It is desirable for such large diameter rollers to have a resilient facing thickness greater than the thickness of rollers 16 and 18. Such rollers of greater size and having resilient facings of greater thickness increases the gripping effectiveness of the rollers on the larger crab leg portions, namely, the knuckles and the pincers, so as to effect a reliable feed of these larger pieces between the rollers.

The feeding belt arrangement for the rollers 66 and 69 can carry the properly oriented leg parts and discharge them into the nip 67 of such rollers at sufficient speed so that they will jump across the gap between the end of the belts and the rollers, and be gripped by the rollers for feeding into their nip. This gap is required in order to provide space for the crab meat that is expressed from the shells to fall downwardly into the meat trough 32a and so that the shells will be recovered in the shell trough 33a. To insure that larger parts will be definitely engaged between the rollers it has been found desirable to have the rollers spaced apart slightly to provide a more receptive nip 67. For average larger king crab parts, such as the knuckles and claws, a half inch spacing is adquate. The lower roller 66 is mounted on a transverse shaft 68 and the upper roller 69 is mounted upon the transverse shaft 70. Similarly to the crab leg lower roller 18, shaft 68 has a block bearing that slides down the slot 22a until the lower end is reached, limiting any further movement. Shaft 70 of roller 69, like the shaft of upper roller 16, has a sliding bearing block which is normally used with a spacer between it and the bearing block of shaft 68 so as to hold the peripheries of the rollers apart.

The hold-down screw 24a will hold the rollers 66 and 69 against the possibility of their being spread farther apart by the pressure of pieces of crab passing between them.

FIGURE 6 is a fragmentary view showing only the feed belts and the belt drive and guiding means for the sake of clarity. A transverse shaft 72, driven by a suitable motor M2 by belt or chain means indicated generally at 73, is mounted at each end on suitable bearings 74 and 75, the bearings not being shown in this diagrammatic view. Disposed in spaced relationship upon shaft 72 are a plurality of belt pulleys 76 rotatable about a horizontal axis to provide the driving means for the plurality of belts forming the conveying means for the leg knuckles and the crab claws. While any number of belts may be used, it has been found convenient to have a lesser number of conveying channels than are used in the leg portion and as a result three coacting pairs of belt 78 and 79 have been shown throughout the drawings.

Each belt 78 and 79 has its down drive pulley 76 which is mounted for rotation about a horizontal axis. Spaced inwardly but reasonably close to shaft 72 are two guide sheaves 80 and 82 which act in cooperative pairs. These have the effect of changing the position of the crab engaging runs of the belts 78 and 79 from a horizontal position to a vertical position. As a consequence of the belt twisting effected by sheaves 80 and 82, the end pulleys for the belts, indicated at 83 and 84, are disposed to rotate about vertical axes. To counteract any tendency for sheaves 80 and 82 to crowd belts 78 and 79 off their drive pulleys 76, rotatable stops 81 are provided for each belt. This arrangement provides the channel 85 for carrying the shell fish parts, three duplicate channels with their coacting pairs of belts being shown in the drawings.

We claim as our invention:

1. A machine for removing meat from king crab legs comprising a pair of substantially parallel coacting pressure rollers disposed in adjacent superposed relationship, at least one of said rollers having a resilient facing, means mounting said rollers for rotation about axes spaced apart unyieldably, power means operatively connected to rotate said rollers in opposite directions to provide a feed side at one side of said pair of rollers and a discharge side at the opposite side, means adjacent to the feed side of said rollers for conveying crab legs lengthwise toward such feed side, power means operatively connected to said conveying means to drive the same, resilient guide means adjacent to the feed side of said rollers engageable by crab legs to guide them from said conveying means between said rollers, meat receiving means disposed below the feed side of said rollers, and means supplying water under pressure to the feed side of said pair of rollers.

2. A machine for removing meat from king crab legs comprising a pair of substantially parallel coacting pressure rollers disposed in adjacent superposed relationship, at least one of said rollers having a resilient facing, means mounting said rollers for rotation about axes spaced apart unyieldably, power means operatively connected to rotate said rollers in opposite directions to provide a feed side at one side of said pair of rollers and a discharge side at the opposite side, means adjacent to the feed side of said rollers for conveying crab legs lengthwise toward such feed side, power means operatively connected to said conveying means to drive the same, and resilient guide means adjacent to the feed side of said rollers engageable by crab legs to guide them from said conveying means between said rollers.

3. A machine for removing meat from king crab legs comprising a pair of substantially parallel coacting pressure rollers disposed in adjacent superposed relationship, at least one of said rollers having a resilient facing, means mounting said rollers for rotation about axes spaced apart unyieldably, power means operatively connected to rotate said rollers in opposite directions to provide a feed side at one side of said pair of rollers and a discharge side at the opposite side, and resilient guide means adjacent to the feed side of said rollers engageable by crab legs to guide them for movement lengthwise between said rollers.

4. The machine defined in claim 3, in which the guide means includes two elongated longitudinally curved guide members disposed in spaced relationship with their convex sides adjacent and with their lengths extending generally transversely of the lengths of the rollers, pivots supporting the ends of said guide members remote from the rollers, respectively, for relative swinging of said guide members, and spring means urging the swinging ends of said guide members toward each other for forming a resilient opening through which a crab leg can be fed to the rollers.

5. The machine defined in claim 3, in which the guide means includes a plurality of elongated resilient guide members disposed in spaced relationship with their lengths extending generally transversely of the lengths of the rollers, and mounting means remote from the rollers supporting said guide mmebers for relative movement to vary the spacing between the ends of said members adjacent to the rollers.

6. A machine for removing meat from king crab legs and claws comprising one pair of substantially parallel coacting pressure rollers disposed in superposed substantially contacting relationship and having a resilient facing for embracing crab legs and feeding them lengthwise between said rollers to squeeze meat therefrom, a second pair of substantially parallel coacting pressure rollers disposed in superposed slightly spaced relationship and having a resilient facing for engaging crab claws and feeding them lengthwise between the rollers of said second pair for squeezing meat therefrom, power means operatively connected to rotate the rollers of said first pair and the rollers of said second pair to provide a feed side at one side of each roller pair and a discharge side at the opposite side of each roller pair, means adjacent to the feed sides of said roller pairs for conveying crab legs and claws lengthwise to said roller pairs, meat receiving means disposed below the feed side of said roller pairs, respectively, shell receiving means disposed below the discharge side of said roller pairs, respectively, water flushing means supplying water to said meat receiving means and said shell receiving means for sluicing the meat and the shells away from the machine, and means supplying water under pressure to the feed sides of both of said pairs of rollers.

7. The machine defined in claim 6, in which the conveying means includes a first set of power driven platform belts, each of a width suitable for transporting a single file of crab legs and arranged to form a horizontal surface, for transporting crab legs to the first pair of said rollers, dividing walls separating said belts, horizontal power driven positioning belts disposed above said platform belts and engageable with crab legs on said platform belts, the upper run of said platform belts and the lower run of said positioning belts travelling in the same direction and at the same speed, and a second set of power driven belts disposed substantially in a horizontal plane with their runs disposed in vertical planes aligned to feed crab claws to the second pair of rollers, drive pulley means for said second set of belts disposed on a horizontal drive shaft, means guiding said belts of said second set to turn them from a horizontal position to a vertical position, and rotatable stop means engageable with belts of said second set to limit spreading movement thereof.

8. A machine for removing meat from king crab legs comprising a pair of coacting pressure rollers disposed in adjacent superposed relationship, power means operatively connected to rotate said rollers in opposite directions to provide a feed side at one side of said pair of rollers and a discharge side at the opposite side, and belt means adjacent to the feed side of said rollers for conveying crab legs lengthwise toward such feed side including a plurality of power driven platform belts, each of a width suitable for transporting a single file of crab legs and arranged to form a horizontal surface for transporting crab legs, and dividing walls separating said belts.

9. The machine defined in claim 8, and a horizontal power diiven belt disposed above a platform belt and driven in the same direction and at the same speed as such platform belt for engagement with the upper side of a crab leg engaged with such platform belt.

References Cited by the Examiner
UNITED STATES PATENTS

| | | | |
|---|---|---|---|
| 1,798,543 | 3/1931 | Kodama | 130—30 |
| 2,660,754 | 12/1953 | Roshko | 17—2 |
| 2,987,759 | 6/1961 | Lapeyre et al. | 17—2 |

SAMUEL KOREN, *Primary Examiner.*

LUCIE H. LAUDENSLAGER, *Assistant Examiner.*